United States Patent Office 3,517,099
Patented June 23, 1970

3,517,099
PRODUCTION OF A CYCLOSERINE-O-CARBAMYL-D-SERINE COMPOSITION
Jay A. Firth, Terre Haute, Ind., assignor to Commercial Solvents Corporation, New York, N.Y., a corporation of Maryland
No Drawing. Filed June 10, 1968, Ser. No. 735,514
Int. Cl. A61k 21/00
U.S. Cl. 424—123      4 Claims

ABSTRACT OF THE DISCLOSURE

A process for the production of a cycloserine-O-carbamyl-D-serine composition from a fermented beer containing them by adding a protein source to the beer, adjusting the pH to within 11.2 to 11.8, readjusting the pH to within the range of 8.2 to 8.8, and recovering the composition, which has known utility as a growth promoter when given orally.

BACKGROUND OF THE INVENTION

This invention relates to the production of an antibiotic composition. In a particular aspect, this invention relates to a process for the production of an antibiotic composition containing cycloserine (CS) in combination with O-carbamyl-D-serine (OCS) suitable for oral administration to animals.

It is known that various antibiotics, including bacitracin, promote growth and increase feed efficiency of animals. It is also known that the activity of bacitracin in animals is potentiated by a combination of CS and OCS. However, when either CS or OCS alone, in an amount equivalent to that of the CS–OCS mixture, is administered with bacitracin, the growth promoting activity is not improved to the same extent as when the CS–OCS combination is administered with the bacitracin.

Cycloserine is a broad spectrum antibiotic possessing activity against both gram negative and gram positive bacteria. It is amphoteric, soluble in water and forms insoluble to partially soluble salts or complexes with silver, mercury, zinc and copper. Cycloserine is produced by fermentation utilizing cycloserine-producing strains of microorganisms of the genus Streptomyces such as *Streptomyces orchidaceous, Streptomyces virginiae,* and *Streptomyces lavendulae.* Several processes are available; namely, those of Harned, U.S. Pat. No. 3,090,730; British Pat. No. 768,007; and Shull et al., U.S. Pat. No. 2,773,878.

The method of Harned, U.S. Pat. No. 3,090,730, has been very successful for the production of cycloserine. According to this method, a cycloserine-producing microorganism of the genus Streptomyces is cultivated in an aqueous fermentation medium consisting of a carbohydrate source, a magnesium source, a potassium source, a phosphate source, an iron source, a zinc source, a manganese source, and a chemically defined nitrogen source at a temperature ranging from about 25° C. to about 37° C. for a period of from about three to five days wherein a ratio of carbohydrate to available nitrogen is maintained at about 10–20 to 1.

In the above process, O-carbamyl-D-serine is simultaneously produced. Its physical and chemical properties and method of preparation by the cultivation of *Streptomyces polychromogenus* are described in U.S. Pat. No. 2,885,433. It slowly decomposes at elevated temperatures.

As previously described, cycloserine and O-carbamyl-D-serine have been found useful in combination with bacitracin in animal feed compositions. However, the use of CS–OCS in feeds has been greatly complicated by the fact that the stability of cycloserine in the presence of moisture is poor and it has been necessary to prepare the CS and OCS separately in a relatively pure state, then combine them in the desired proportions with the other feed ingredients immediately prior to feeding the animals to obtain the growth-promoting benefits. Previously, it has not been feasible to prepare the CS–OCS combination in a single step due to high losses of CS. Consequently, the CS–OCS composition has been relatively expensive to produce.

SUMMARY OF THE INVENTION

It is an object of this invention to provide a process for the production of an antibiotic composition.

A second object of this invention is to provide a process for the production of a crude cycloserine-O-carbamyl-D-serine composition suitable for oral administration to animals.

Other objects of this invention will be obvious to those skilled in the art from the disclosure herein.

It has now been discovered that the CS–OCS combination suitable for oral administration to animals can be produced economically in good yields and in a stable form. According to the new process, CS and OCS are formed in a nutrient fermentation medium in accordance with previous processes. After the fermentation is complete, a protein source is added in cycloserine-stabilizing amounts to the fermentation medium, known as broth or, more commonly, as "beer" to those skilled in the art, the pH is adjusted to within the range of from about 11.2 to 11.8, then reduced to within about 8.2 to 8.8. The mixture is then concentrated and dried by any suitable method.

DETAILED DESCRIPTION

The process of this invention can be used for the preparation of a CS–OCS combination from any fermented beer containing suitable amounts of these two compounds. Preferably, the CS and OCS are prepared by fermentation according to the method of Harned, U.S. Pat. No. 3,090,730, to provide a beer containing the dissolved CS and OCS. When the fermentation is complete, the beer, either whole or filtered is delivered to a reaction vessel. The protein source is then added in an amount sufficient to stabilize the CS during the drying step, e.g. about 1.2 to 2.4 g. or more of protein per pound of beer, and the mixture is well agitated to insure thorough mixing. The pH is then adjusted to within the range of from about 11.2 to about 11.8, preferably from 11.4 to 11.6. A pH of 11.5 is particularly preferred. The pH adjustment is effected by gradual addition accompanied by thorough agitation of finely ground calcium hydroxide or calcium oxide, either as the dry powder or as an aqueous suspension. The calcium compound used should be free from deleterious contaminants. During the pH adjustment substantial solubilization of the protein is effected.

After addition of the calcium hydroxide or oxide is complete, the pH of the beer is adjusted to about 8.2 to 8.8, preferably 8.4 to 8.6 with an acid having a pharmaceutically acceptable anion. A pH of 8.5 is particularly preferred. The beer is then preferably concentrated by evaporation at a pressure below about atmospheric pressure at a temperature of up to about 60° C. in an evaporator, generally to about 1.0% to 25%, preferably about 20%, of the initial volume, and is then dried or recovered by any suitable means, e.g. by spray drying or drum drying. The resulting product is a relatively stable, free-flowing product.

In a preferred embodiment of the present invention, the beer is filtered to obtain a higher concentration of CS–OCS in the dried product. After filtering, the beer is generally, but not necessarily, treated with char (activated carbon) as is known in the art.

The protein suitable for use in the practice of this invention can be any animal or vegetable protein which can be dispersed in water to form a solution, generally colloidal; in the present case the term is intended to cover precipitated proteins which can be redispersed in water, including redispersion through the action of bases. Suitable proteins include but are not limited to uncoagulated cesein, gelatin, zein, albumin, animal blood plasma, soya protein and the like and casein is preferred. The proteins should be of a quality suitable for animal feed use, inasmuch as the preparation is intended for oral administration. Dried milk is a suitable source of casein. An excess of the protein is not objectionable because it is simply a nutritious component.

The acid used for pH adjustment should be of good quality, free from deleterious contaminants. Suitable acids include, but are not limited to, hydrochloric, sulfuric, phosphoric, acetic, propionic and butyric acids. However sulfates, including calcium sulfate, are generally considered undesirable for animal use, so sulfuric acid will generally not be employed. Phosphoric, acetic and propionic acids are preferred, and acetic is particularly preferred.

The dried solids comprising the cycloserine and OCS antibiotic composition are administered orally to animals to obtain the growth promoting benefits previously described. The composition can be administered in any suitable manner, many of which are known. One method contemplated is to add a predetermined effective amount to, for example, one day's feed rations and make it available to the animal or animals to be treated at their customary feeding stations. Other modes of administration will be obvious ao those skilled in the art.

The following examples illustrate the invention. In these examples the beer was obtained from regular plant fermentation runs produced according to the following method.

*Streptomyces orchidaceous* was cultivated for a period of 24 hours at 30° C. in an aqueous seed culture medium of the following composition:

| | G./l. |
|---|---|
| Glucose | 10 |
| Soybean meal | 20 |
| Calcium carbonate | 2 |

A 9000-gallon portion of the following medium was then placed in a fermentor and the contents thereof sterilized for 5 minutes at 115° C.

| | Percent by weight |
|---|---|
| Glucose | 5 |
| $MgSO_4 \cdot 7H_2O$ | 0.05 |
| $K_2HPO_4$ | 0.05 |
| $FeSO_4 \cdot 7H_2O$ | 0.002 |
| $ZnSO_4 \cdot 7H_2O$ | 0.002 |
| $MnSO_4$ | 0.001 |
| Lard oil | 0.4 |

Sterile urea, 0.48%, was then added to the sterilized medium. The fermentor was inoculated with 800 gallons of seed culture prepared as above-described, and the medium was incubated at 30° C. for 86 hours, the medium being aerated at a rate of 800 cubic feet per minute. At the end of 86 hours the fermentation was determined to be completed.

EXAMPLE 1

Fermented beer prepared as above was filtered and treated with activated carbon. It assayed 4.27 g./l. cycloserine, 3.76 g./l. O-carbamyl-D-serine, and had a total solids of 18.5 g./l. An 84 lb. portion of the filtered beer was delivered to a reaction vessel and 100 g. of casein was added with stirring. Powdered calcuim hydroxide, 175 g., was gradually added with stirring until the pH was approximately 11.5. Glacial acetic acid, 140 ml., was then added slowly until the pH was approximately 8.5. The mixture was then concentrated to about 16 lb. in an evaporator at reduced pressure in a period of about 65 minutes. The resulting mixture was then spray dried in a period of about 65 minutes resulting in 572 g. of product having 9.34% by wt. cycloserine and 8.96% O-carbamyl-D-serine, corresponding to a recovery of 68% of the CS and 58% of the OCS.

A portion of the dried material was stored in a closed vial at 45° C. to evaluate the stability. O-carbamyl-D-serine is known to be much more stable than cycloserine, so a preparation having satisfactory stability with respect to the latter would also be satisfactory with respect to the former. Accordingly, the OCS was not assayed. The following data were obtained.

| Time, weeks: | Percent of original CS |
|---|---|
| 2 | 91 |
| 5 | 97 |

This is a very severe test and the sample was determined to have satisfactory stability.

EXAMPLE 2

The experiment of Example 1 was repeated except that 200 g. of casein was substituted for 100 g., and the volume of acetic acid used was 138 ml. After evaporating and spray drying, the weight of product was 1126 g. having a CS content of 9.1% wt. and OCS 11.3%. representing recoveries of 72% CS and 79% OCS.

This example was repeated except that the pH was adjusted to only 8.5 instead of 11.5 and no acetic acid was added. Recovery of CS was 44% and of OCS, 58%.

EXAMPLE 3

The experiment of Example 1 is repeated except that whole beer is substituted for filtered beer and the mixture is drum dried. The resulting product is useful to enhance the growth-promoting properties of animal feeds formulated with antibiotics.

EXAMPLE 4

The experiment of Example 1 is repeated except that gelatin is substituted for casein. A high yield of CS–OCS is obtained. The antibiotic composition has good stability.

EXAMPLE 5

The experiment of Example 1 is repeated except that zein is substituted for casein. A high yield of CS–OCS is obtained. The antibiotic composition has good stability.

EXAMPLE 6

The experiment of Example 1 is repeated except that albumin (dried egg whites) is substituted for casein. A high yield of CS–OCS is obtained. The antibiotic composition has good stability.

EXAMPLE 7

The experiment of Example 1 is repeated except that animal blood plasma is substituted for casein. A high yield of CS–OCS is obtained. The antibiotic composition has good stability.

EXAMPLE 8

The experiment of Example 1 is repeated except that soya protein is substituted for casein. A high yield of CS–OCS is obtained. The antibiotic composition has good stability.

What is claimed is:

1. A process for the production of an antibiotic composition from a fermented beer containing cycloserine and O-carbamyl-D-serine comprising the steps of:
    (a) adding a protein source selected from the group consisting of casein, soya protein, zein, gelatin, albumin and animal blood protein to said beer in cycloserine-protecting amounts of about 1.2 to 2.4 g. per pound of said beer,
    (b) adjusting the pH of said beer to within the range of from 11.2 to 11.8 with calcium hydroxide or calcium oxide, (c) adjusting the pH to within the range of from 8.2 to about 8.8 with an acid having a pharmaceutically acceptable anion, (d) concentrating said beer at a temperature of up to about 60° C. at a pressure below atmospheric pressure to effect a reduction in volume of said beer to from about 1.0% to about 25% of the initial volume to produce a concentrated medium, and (e) drying said beer to produce said antibiotic composition.

2. The process of claim 1 wherein said beer is filtered to remove the cells of the said organism and the said composition is recovered by spray drying the said beer.

3. The process of claim 1 wherein the said acid is selected from the group consisting of hydrochloric, sulfuric, phosphoric, acetic, propionic, and butyric.

4. The process of claim 1 wherein the protein source is casein.

References Cited

UNITED STATES PATENTS

| 2,773,878 | 12/1956 | Shull et al. | 424—116 |
| 2,885,433 | 5/1959 | Hagemann et al. | 424—300 |
| 3,090,730 | 5/1963 | Harned | 195—80 |

ALBERT T. MEYERS, Primary Examiner

D. M. STEPHENS, Assistant Examiner